F. B. COOK.
CABLE TERMINAL.
APPLICATION FILED AUG. 11, 1913.
1,204,412.
Patented Nov. 14, 1916.
2 SHEETS—SHEET 1.
FIG. 1
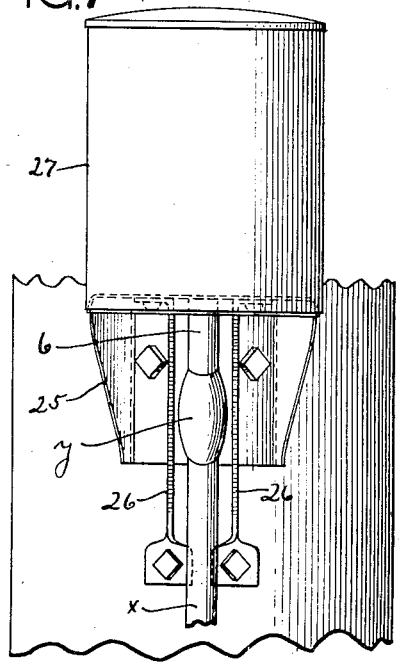
FIG. 2
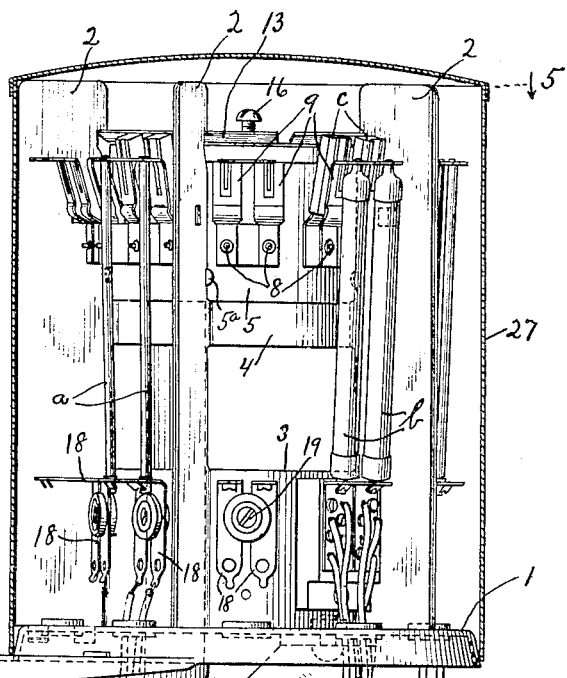
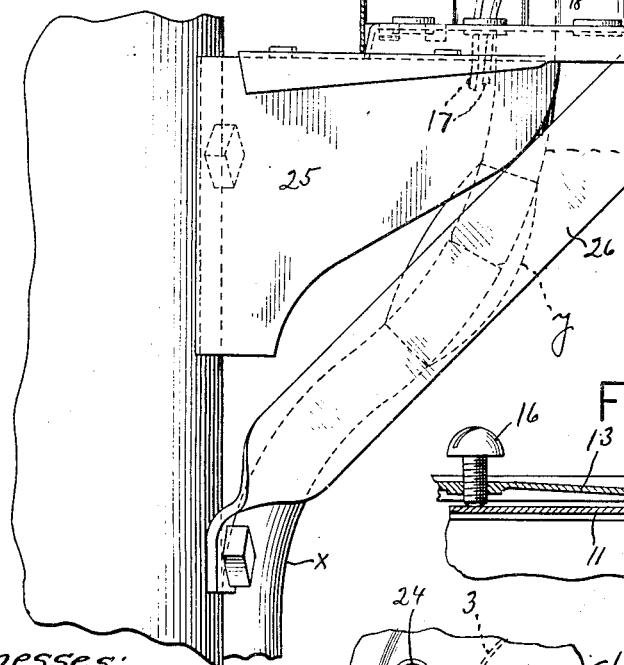
FIG. 3
FIG. 4
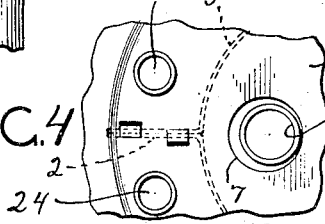
Witnesses:
J. C. Devick.
George L. Chindahl.
Inventor:
Frank B. Cook.
By Luther L. Miller
Atty.

F. B. COOK.
CABLE TERMINAL.
APPLICATION FILED AUG. 11, 1913.
1,204,412.
Patented Nov. 14, 1916.
2 SHEETS—SHEET 2.
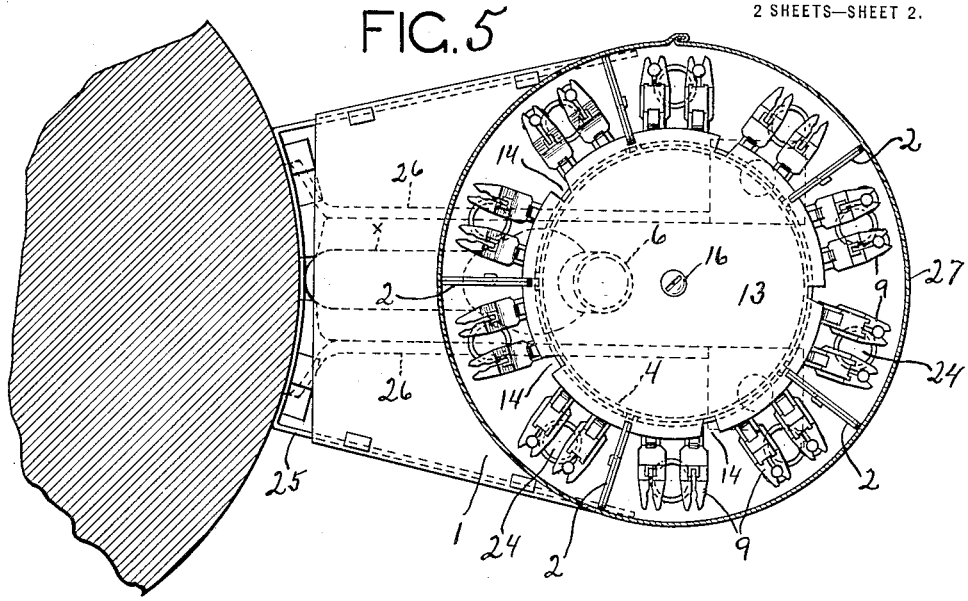
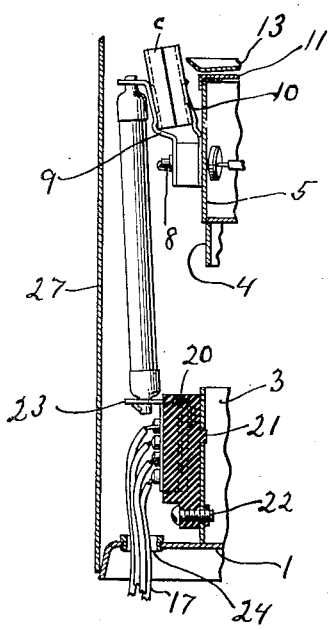
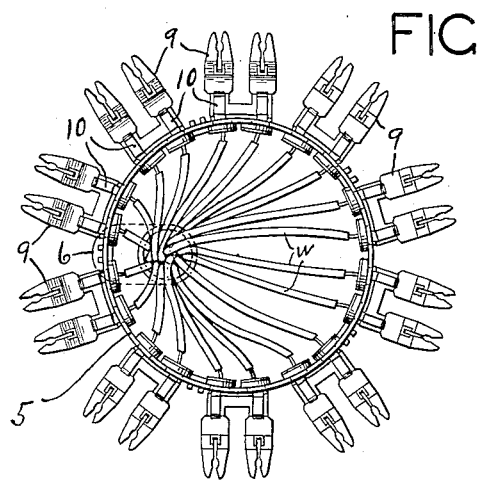
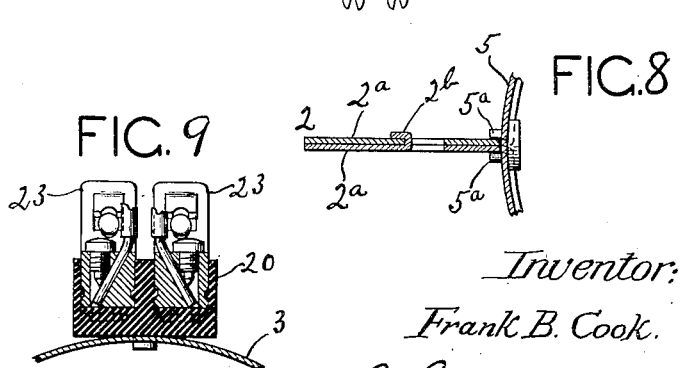
Witnesses:
J. C. Devick.
George L. Chindahl
Inventor:
Frank B. Cook.
By Luther L. Miller
Aty.

UNITED STATES PATENT OFFICE.

FRANK B. COOK, OF CHICAGO, ILLINOIS, ASSIGNOR TO FRANK B. COOK COMPANY, OF CHICAGO, ILLINOIS, A CORPORATION OF ILLINOIS.

CABLE-TERMINAL.

1,204,412.  Specification of Letters Patent.  Patented Nov. 14, 1916.

Application filed August 11, 1913. Serial No. 784,020.

*To all whom it may concern:*

Be it known that I, FRANK B. COOK, a citizen of the United States, residing at Chicago, in the county of Cook and State of Illinois, have invented certain new and useful Improvements in Cable-Terminals, of which the following is a specification.

This invention refers to terminals for telephone, telegraph and other electrical cables, such terminals being provided with means for distributing the various conductors of the cables and for protecting the conductors against excessive currents.

With cable terminals as heretofore constructed the work of distributing the conductors has been done after the terminal was mounted upon the pole or other support.

One of the objects of this invention is to avoid the inconvenience and tediousness attending the distribution of the wires by the lineman while on the pole, by providing a removably mounted distributing section which is held in place by quickly operable means so as to permit easy removal of said section, whereby the wires may be distributed in the shop or in any other convenient place.

It is frequently the case that a company installing cable terminals desires, for reasons of economy, to dispense with protection for the individual conductors until some future time. Heretofore there has been no construction of cable terminal which permitted of a convenient change from an unprotected to a protected condition of the circuits.

One of the objects of this invention is to provide a cable terminal of such nature that fuses and lightning arresters may be conveniently installed thereon at any time and without alteration of the terminal. Cable terminals have heretofore been mounted upon the pole in such a manner that the portion of the cable entering the terminal was readily accessible to the lineman, and constituted a temptation to him to use the cable as a hand-hold in ascending or descending the pole, with consequent liability of straining and injuring the electrical connections.

It is one of the objects of this invention to mount or brace the terminal in such a way that the lineman shall not be apt to use the cable as a hand-hold.

A further object is to provide means whereby changes in the number of parties on a given line may be conveniently made.

A further object is to dispense with the use of porcelain and similar fragile insulating material in the construction of cable terminals.

A further object is to devise such a construction of the parts of a cable terminal that they may be assembled to produce various sizes of terminals.

The invention also relates to the other improvements in cable terminals hereinafter set forth.

In the accompanying drawings, Figure 1 is an elevation of a cable terminal showing the improved method of mounting the terminal. Fig. 2 is a view illustrating the terminal in place upon a pole, the inclosing casing being in section. Fig. 3 is a fragmental sectional detail. Fig. 4 is a fragmental underside view. Fig. 5 is a horizontal sectional view taken in the plane of dotted line 5 of Fig. 2. Fig. 6 is a fragmental sectional view of the terminal. Fig. 7 is a plan view of a removable section of the terminal. Figs. 8 and 9 are sectional detail views.

In the embodiment herein shown of the invention, the terminal comprises a sheet-metal base plate 1, a plurality of vertical radial frame-bars 2 fixed at their lower ends to the base plate, an annular vertical ring 3, connected to the inner edges of the radial bars 2, and located relatively close to the base plate, and an annular vertical ring 4 connected to the inner edges of the bars 2 and located above the ring 3. While these parts may be constructed in various ways, it is advantageous to form each frame bar 2 of two metal plates $2^a$ secured together in a suitable way, as by clenched lugs $2^b$ (Fig. 8). The adjacent plates $2^a$ of every two adjacent bars 2 are formed integral with a section of the ring 3 and a section of the ring 4. Thus it will be understood that each of the rings 3 and 4 consists of a plurality of sections, each section extending between and integrally connecting a pair of the plates $2^a$.

The terminal further comprises a removable distributing section which, in the present embodiment, consists of a cup-shaped element 5 adapted to fit between the upper ends of the frame bars 2 and rest upon the ring 4. Fixed to the bottom of the cup 5 is a nozzle 6, through which the conductors of a cable may be passed into the cup. The nozzle 6 extends through an aperture 7 in the base plate 1 and is of sufficient length to permit of conveniently attaching a cable sheath thereto. If desired, the nozzle 6 may be of the well-known self-soldering type.

Around the outer side of the cup 5 is a series of cable-conductor terminals. These terminals may be of various forms, that herein shown comprising hollow connecting posts 8 which may be similar to those fully described in Patent No. 897062, granted to me on August 25, 1908. Associated with each connecting post 8 is a spring member 9 and a grounding spring member 10. The posts 8 are insulated from the cup 5 and the spring members 10, but are electrically connected to the spring members 9. The cup 5 is provided with a flanged cover 11, a gasket 12 preferably being interposed between the cup and its cover.

The cup 5 may be secured in place on its seat 4 by any suitable means. That herein shown comprises a disk 13 having slots 14 in its periphery to receive the inner edges of the frame bars 2, the latter having notches 15 therein. After the disk 13 has been placed on top of the cover 11, said disk is turned to carry the slots 14 out of register with the frame bars 2, as shown in Fig. 5, thereby placing the periphery of the disk in the notches 15. In the center of the disk is a clamping screw 16 arranged to bear against the cover 11 and thus clamp the latter in place.

In order accurately to position the cup 5 on its seat so that the members 9 shall register properly with coöperating members to be later described, said cup may be provided with pairs of lugs 5ª (Fig. 8) adapted to lie at opposite sides of the frame bars 2.

On the outer side of the ring 3 is a series of devices for supporting circuit-protectors and for connecting in circuit the jumper wires 17. These devices may be of any suitable construction; herein I have shown two forms, one adapted for single-party lines and the other for plural-party lines. The first mentioned form is illustrated at 18 and is substantially similar to the one designated 25 and 35 in the before-mentioned patent. The devices 18 are secured to the ring 3 by means of bolts 19.

In the present embodiment, each plural-party terminal comprises a block 20 of insulating material, said block having a locating stud 21 adapted to enter one of the holes provided for the bolts 19, and being secured to the ring 3 by means of a bolt 22. There is a series of holes for the reception of the bolts 19 and 22 and the studs 21, so that single-party or plural-party terminals may be mounted on the ring 3 at any desired point and in any desired order. The plural-party terminals further comprise members 23 adapted to receive fuses or direct-connection wires. The jumper wires extend through openings 24 in the base plate 1.

The cable terminal may be mounted upon a pole or other support by means of a bracket 25 of any suitable character, and two braces 26, said braces extending at opposite sides of the nozzle 6, and extending in an inclined direction between the base plate 1 and the support. The parts mounted upon the base plate are covered by a casing 27 which rests removably on the base plate and is held against lateral dispacement by the frame bars 2.

In practice, when a terminal is to be installed, the cup 5 with its nozzle 6 is removed, and the remainder of the terminal mounted on the pole. At the shop or at any other convenient place, relatively short conductors $w$ are inserted into the nozzle 6, and all of said conductors are fanned out in the cup 5 and passed through the hollow posts 8. The ends of the conductors may be soldered or otherwise secured to the outer ends of the posts 8. If desired, the cup may then be filled with a suitable insulating compound (not shown). The lineman then places the cup upon its seat 4, and splices the ends of the conductors $w$, which protrude from the lower end of the nozzle 6 to the ends of the conductors of the cable $x$. The cable sheath and the nozzle 6 are then united in any suitable way, as by a wipe joint $y$.

It will be seen that my invention obviates the necessity of distributing the cable wires after the terminal is mounted on the pole, as this work may be done at any convenient time and place. Moreover, in case of trouble with any of the connections on the cup 5, the lineman need not search out the source of trouble while at the terminal, but may cut the cable, remove the cup, substitute another and connect the wires of the new cup to the wires of the cable.

The elements 9, 18 and 23 are adapted to support direct-connector rods $a$ or fuses $b$. Carbon lightning arresters $c$ may or may not be placed between the springs 9 and 10, as considerations of economy may dictate. Thus it will be seen that the company owning the terminal may, if desired, dispense with circuit-protective devices for a period of time, and may later provide fuses $b$ or lightning arresters $c$ or both, without making any alterations of the terminal. Single-party and plural-party terminals may be used upon the cable terminal in any desired combination. The braces 26 extend at opposite sides of and in the same general direction as, the cable $x$ and the nozzle 6, and thus serve as guards for said cable and nozzle and prevent the lineman from using the cable or nozzle as a hand-hold.

In the manufacture of the terminal, the frame sections formed of the parts 2ª, and the integral sections of the rings 3 and 4 may be assembled in greater or less numbers to produce terminals of greater or less diameter. It will be understood that the curvature of the rings 3 and 4 and the angle between said rings and the plates 2ª may be readily altered to conform to the diameter of the terminal to be constructed.

I claim as my invention:

1. A cable terminal comprising a base, a plurality of upright members rising from said base, means at the lower portion of said members supporting a circular series of terminals, a cup-shaped element removably mounted on said upright members above said terminals, and a second series of terminals mounted on said cup element around its outer side and coöperatively positioned with respect to the first series of terminals.

2. A cable terminal comprising a base, a plurality of upright members rising therefrom, a ring mounted on the lower portions of said members, a series of terminals mounted on said ring, a second ring mounted on said members above the first ring, a distributing cup removably seated on the second ring between the upper ends of said members, and a series of terminals mounted upon said cup.

3. A cable terminal comprising a base, a plurality of upright members rising therefrom, means at the lower portion of said members supporting a series of terminals, a cup-shaped element removably supported upon and between said members above said series of terminals, a second series of terminals mounted on said cup, and a nozzle fixed to said cup and extending down through said base and adapted to receive conductors running to the terminals carried by the cup.

4. A cable terminal comprising a base, a plurality of upright members rising therefrom, a ring supported at the lower ends of and between said members, a circular series of terminals mounted on the outer side of said ring, said base having a plurality of openings corresponding to said terminals and adapted to receive jumper wires running to the latter, a cup removably supported upon and between said members above said ring, a circular series of terminals mounted on the outer side of said cup, and a nozzle attached to the bottom of the cup and extending downwardly through said base and adapted to receive conductors running to the terminals on the cup.

5. A cable terminal comprising a plurality of upright frame-members, a distributing cup positioned between said members and supported thereby, said cup having a cover, and means engaging said frame-members and overlying said cover to hold the latter in place.

6. A cable terminal comprising upright frame-bars, a distributing cup positioned between said bars and supported thereby, the cup having a cover closing its upper end, a disk overlying said cover and engaging said frame-bars, and means carried by said disk for clamping the cover in place.

7. A cable terminal comprising a base plate; a plurality of vertical frame bars arranged around said base plate; a ring located between said bars adjacent to said base plate; a series of jumper-wire terminals on said ring; another ring located between the frame bars and above the first mentioned ring; a cup seated on the second mentioned ring; a series of cable-conductor terminals on the outer side of said cup; and a cable-receiving nozzle attached to the bottom of the cup and extending downwardly through said rings.

8. A cable terminal comprising a plurality of upright frame-bars, a ring supported thereby, a cup positioned between said bars and resting on said ring, said cup having a cover closing its upper end, a disk overlying said cover, and having notches in its periphery adapting the disk to be passed downwardly between said frame-bars, the latter having notches in their inner edges, whereby the disk may be rotated to carry its notches out of registry with the notches in the frame-bars, and a centrally positioned screw carried by the disk and arranged to bear against the cover for said cup.

9. A cable terminal comprising a framework; a distributing cup supported in said framework; a cover for said cup; an element adapted to bear against the framework; and means carried by said element arranged to clamp the cover to the cup.

10. A cable terminal comprising a framework including a plurality of vertical frame members; a distributing cup located between said members, certain of said frame members having a notch therein; an element arranged to engage within said notches and be held thereby against upward movement; and means carried by said element for clamping the cup in place.

11. A cable terminal comprising upright frame-members, a cup positioned between and supported by said members, said cup having a cover, and means engaging said frame-members and overlying said cover to hold the latter in place.

12. A cable terminal comprising a supporting structure having two series of openings therein; single-party terminals; bolts for connecting said terminals to said structure, said bolts being adapted to pass through the openings of one series; plural-party terminals having locating studs adapted to pass through said bolt-receiving openings; and bolts for securing said plural-party terminals to said structure, the last mentioned bolts being adapted to pass through the openings of the second mentioned series.

13. A cable terminal comprising upright frame-members, a ring supported thereby, and a distributing section positioned between said members and resting on said ring.

14. A cable terminal comprising upright frame-members, supporting means thereon, and a distributing section positioned between said frame members but unattached thereto, and resting loosely on said supporting means, whereby said section may be conveniently removed.

15. A cable terminal comprising upright frame-members, a ring supported at the lower portions of said members, a circular series of terminals mounted on said ring, a distributing section positioned between said members above said ring, said section being supported by said members but unattached thereto, whereby said section is upwardly withdrawable, a series of terminals mounted on said section, and means on said section engaging said frame-members to guide the section into proper relation to said ring.

In testimony whereof I affix my signature in the presence of two witnesses.

FRANK B. COOK.

Witnesses:
L. L. MILLER,
GEORGE L. CHINDAHL.